(12) United States Patent
Lonsdorfer et al.

(10) Patent No.: US 8,919,696 B2
(45) Date of Patent: Dec. 30, 2014

(54) METHOD AND A DEVICE FOR THE MANUFACTURE OF A STIFFENING STRUCTURE FOR AN AIRCRAFT FUSELAGE SEGMENT, AND ALSO A STIFFENING STRUCTURE

(75) Inventors: Georg Lonsdorfer, Stade (DE); Hauke Seegel, Nahrendorf (DE); Klaus Rode, Oberhaching (DE); Andreas Pau, Markdorf (DE); Hartmut Herter, Tettnang (DE); Kevin Danke, Stade (DE)

(73) Assignee: Airbus Operations GmbH, Hamburg (DE)

( * ) Notice: Subject to any disclaimer, the term of this patent is extended or adjusted under 35 U.S.C. 154(b) by 418 days.

(21) Appl. No.: 12/980,479

(22) Filed: Dec. 29, 2010

(65) Prior Publication Data

US 2011/0186683 A1 Aug. 4, 2011

Related U.S. Application Data

(60) Provisional application No. 61/290,524, filed on Dec. 29, 2009.

(30) Foreign Application Priority Data

Dec. 29, 2009 (DE) .......................... 10 2009 060 706

(51) Int. Cl.
| | | |
|---|---|---|
| *B64C 1/00* | (2006.01) | |
| *B29D 99/00* | (2010.01) | |
| *B29C 70/30* | (2006.01) | |
| *B29C 70/48* | (2006.01) | |
| *B29C 70/54* | (2006.01) | |
| *B64C 1/06* | (2006.01) | |
| *B64C 1/12* | (2006.01) | |

(52) U.S. Cl.
CPC ............ *B29D 99/0014* (2013.01); *B29C 70/30* (2013.01); *B29C 70/48* (2013.01); *B29C 70/545* (2013.01); *B64C 1/064* (2013.01); *B64C 1/12* (2013.01); *B64C 2001/0072* (2013.01); *Y02T 50/433* (2013.01); *Y02T 50/43* (2013.01)
USPC ........ 244/119; 244/117; 244/123.1; 244/120; 244/131; 29/421.2; 72/56

(58) Field of Classification Search
USPC .......... 244/117 R, 119, 123.1, 131, 120, 132, 244/123.12, 123.13, 123.4, 123.6; 29/421.2, 897.2, 469.5; 72/56, 57, 60, 72/341
See application file for complete search history.

(56) References Cited

U.S. PATENT DOCUMENTS

| | | | | |
|---|---|---|---|---|
| 2,451,131 A | * | 10/1948 | Vidal et al. ..................... | 156/222 |
| 2,997,262 A | * | 8/1961 | Kirk et al. ................ | 244/123.12 |
| 3,962,393 A | * | 6/1976 | Blad ............................. | 264/571 |

(Continued)

*Primary Examiner* — Isam Alsomiri
*Assistant Examiner* — Assres H Woldemaryam
(74) *Attorney, Agent, or Firm* — Leydig, Voit & Mayer, Ltd.

(57) ABSTRACT

A method for stiffening a skin field of an aircraft fuselage includes providing a skin field for an aircraft fuselage, manufacturing an integral lattice-shaped stiffening structure including a plurality of longitudinal stiffeners and connecting the stiffening structure to the skin field. The manufacturing can include the use of a tool mold having a plurality of longitudinal recesses configured to form longitudinal stiffeners and a plurality of sunken areas disposed between the longitudinal recess. The sunken areas are configured for forming respective mounts that are configured for connection to circumferential stiffeners.

8 Claims, 6 Drawing Sheets

(56) References Cited

U.S. PATENT DOCUMENTS

| | | | |
|---|---|---|---|
| 5,251,849 A * | 10/1993 | Torres | 244/117 R |
| 6,245,274 B1 * | 6/2001 | Huybrechts et al. | 264/257 |
| 6,306,239 B1 * | 10/2001 | Breuer et al. | 156/245 |
| 6,364,250 B1 * | 4/2002 | Brinck et al. | 244/119 |
| 6,508,909 B1 * | 1/2003 | Cerezo Pancorbo et al. | 156/306.6 |
| 6,511,570 B2 * | 1/2003 | Matsui | 156/245 |
| 6,684,593 B2 * | 2/2004 | Brenneis et al. | 52/630 |
| 7,093,470 B2 * | 8/2006 | El-Soudani | 72/56 |
| 7,510,757 B2 * | 3/2009 | Lee et al. | 428/172 |
| 7,748,119 B2 * | 7/2010 | Kismarton | 29/897.2 |
| 2001/0004096 A1 * | 6/2001 | Entelmann et al. | 244/119 |
| 2001/0015043 A1 * | 8/2001 | Brenneis et al. | 52/630 |
| 2004/0055349 A1 * | 3/2004 | El-Soudani | 72/56 |
| 2004/0075023 A1 * | 4/2004 | Assler et al. | 244/117 R |
| 2007/0108347 A1 | 5/2007 | Sankrithi | |

* cited by examiner

METHOD AND A DEVICE FOR THE MANUFACTURE OF A STIFFENING STRUCTURE FOR AN AIRCRAFT FUSELAGE SEGMENT, AND ALSO A STIFFENING STRUCTURE

CROSS REFERENCE TO RELATED APPLICATIONS

This application claims priority from U.S. Provisional Patent Application Ser. No. 61/290,524, filed Dec. 29, 2009 and German Patent Application No. DE 10 2009 060 706.4, filed Dec. 29, 2009, which are hereby each incorporated by reference herein in their entirety.

FIELD

The invention concerns a method, in particular for purposes of stiffening a skin field of an aircraft fuselage, and a stiffening structure.

BACKGROUND

Fuselage segments in aircraft construction consist in general of a skin field and a backing structure for purposes of stiffening the skin field. The backing structure conventionally has a multiplicity of longitudinal stiffeners, which are arranged directly on the skin field, and a multiplicity of circumferential stiffeners, which are connected to the skin field by means of mounts, e.g. clips, and in addition are supported on the longitudinal stiffeners by means of supporting elements, e.g. cleats.

The manufacture of fuselage segments of this type takes place either in a differential form of construction, or in an integral form of construction. In the differential form of construction the individual components are produced separately from one another, and are subsequently joined to form the total module. What is particularly disadvantageous in this form of construction is the time- and cost-intensive assembly of the total module, and in particular, if metallic materials are being used, the relatively high weight of the total module. Furthermore, the differential form of construction requires a multiplicity of connecting elements to connect the components together. The integral form of construction, which is shown, for example, in US 2007/0108347, and in which the individual components are integrally produced as a total module, is distinguished by a reduced level of assembly resource and by a low weight as a result of the use of fiber-reinforced composite materials. However the level of integration leads to a significant increase in production resource and production risks. Thus, there are, for example, still no reliable predictions concerning the effects of temperature and setting paths of the fiber-reinforced composite materials on production tolerances.

SUMMARY

An aspect of the present invention is to provide a method, in particular for purposes of stiffening a skin field of an aircraft fuselage, which eliminates the disadvantages cited above, and yields a higher process reliability with reduced production resource, a device for purposes of executing a method of this type, and also a corresponding stiffening structure.

In an embodiment, the present invention provides a method for stiffening a skin field of an aircraft fuselage includes providing a skin field for an aircraft fuselage, manufacturing an integral lattice-shaped stiffening structure including a plurality of longitudinal stiffeners and connecting the stiffening structure to the skin field. In another embodiment, the invention provides a device for manufacturing a stiffening structure that includes a tool mold having a plurality of longitudinal recesses configured to form longitudinal stiffeners and a plurality of sunken areas disposed between the longitudinal recess. The sunken areas are configured for forming respective mounts that are configured for connection to circumferential stiffeners. Another embodiment of the invention includes the stiffening structure itself.

BRIEF DESCRIPTION OF THE DRAWINGS

Exemplary embodiments of the present invention are described in more detail below with reference to the schematic drawings, in which.

In the figures the same design elements bear the same reference numbers, and where there is a plurality of the same design elements in one figure just some of these design elements are provided with a reference number for reasons of clarity.

DETAILED DESCRIPTION

Figure 1:
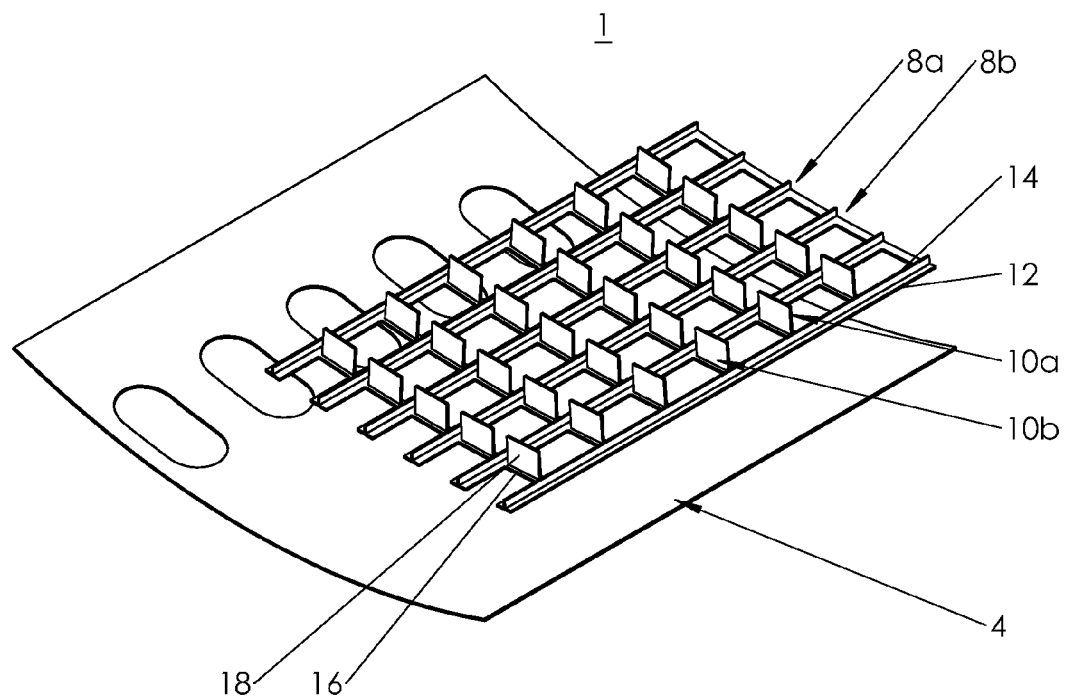
FIG. 1 shows a perspective view of a first stiffening structure in accordance with an embodiment of the invention.

In a method in accordance with an embodiment of the invention, in particular for purposes of stiffening a skin field of an aircraft fuselage, an integral lattice-type stiffening structure is manufactured with a multiplicity of longitudinal stiffeners. A skin field is then provided, and the stiffening structure is subsequently connected to the skin field. This method combines the advantages of the differential form of construction with those of the integral form of construction, such that the stiffening structure as a whole can be connected to the skin field with reduced assembly resource. The reduced assembly resource, however, has a not disadvantageous outcome on the production resource for the total module, since the stiffening structure and the skin field are manufactured separately from one another, such that the method has a reduced level of integration, and thus a reduced production resource and an increased level of process reliability, compared with the conventional integral form of construction. Moreover, the total number of individual components necessary is greatly reduced, since the stiffening structure is no longer connected to the skin field as individual parts, but as one module. Furthermore an improved level of access and a simplified stock of components is achieved. In particular, inspection of the stiffening structure is simplified, since the longitudinal stiffeners can be inspected from all sides, that is to say from underneath also, or in the case of Omega-longitudinal stiffeners, internally also. Furthermore, by virtue of the reduced production resource and the high level of process reliability, the method allows a high batch size and thus a high rate of production.

The stiffened skin field can in principle be manufactured from metallic materials, from fiber-reinforced composite materials, or from a combination of both materials, wherein in particular if fiber-reinforced composite materials are used the stiffened skin field can be embodied, i.e. manufactured, in a manner optimised for weight and loading. The connection of the stiffening structure to the skin field is matched to the materials selected and can in principle take place by means of bonding, welding or riveting, while bonding is preferred, however. However, fiber-reinforced composite materials in the form of pre-impregnated CFRP mats are preferably used. Appropriate knitted or woven materials, and similar are, however, also conceivable. Similarly, dry semi-finished fiber products can also be deployed.

In one preferred method the longitudinal stiffeners are connected with one another by means of mounts extending in the transverse, i.e. circumferential direction, for the connection of circumferential stiffeners. The mounts can be formed in one piece with the longitudinal stiffeners, so that any labour-intensive connection tasks are eliminated. By this means the circumferential stiffeners can be connected with precision to the stiffening structure, either after assembly of the stiffening structure onto the skin field, or before assembly.

In particular if a semi-finished fiber product is used for the formation of the longitudinal stiffeners it can be locally modified, for example by means of additional reinforcement fibers, or by means of a different orientation of the fibers, such that individual sections of the stiffening structure are optimally matched to locally-occurring loadings. As a result of the integration of the mounts into the stiffening structure, the number of parts and steps in the assembly are further reduced. Similarly, the number of production forming elements, such as pressure pieces, is further reduced. The positioning accuracy is further increased, and the assembly of the circumferential stiffeners, or frames, is greatly simplified, since by means of the mounts a so-called frame track is specified exactly, and subsequent labour-intensive adjustment tasks during the connection of the circumferential stiffeners can be eliminated. The need for washers, or spacers, i.e. what is called "shimming", for purposes of tolerance compensation is eliminated.

In one embodiment in accordance with the invention, a flat semi-finished fiber product is laid down on a multi-part production aid, with a supporting core, and two rigid cores extending in the longitudinal direction of the supporting core. Then a U-shaped profile, with two web halves in each case, is formed from the flat semi-finished fiber product by guiding the semi-finished fiber product around the rigid cores in the region of its edge sections. Next mounts are formed by making incisions in the semi-finished fiber product in the region of sunken areas arranged in the supporting core, and by the introduction, i.e. folding in, of the incised semi-finished product sections into the sunken areas. Next the U-shaped semi-finished fiber product is removed from the supporting core and by insertion of the rigid cores into longitudinal recesses of a tool mold is positioned on the same. For the formation of the mounts the incised semi-finished product sections are then introduced into sunken areas of the tool mold extending between the longitudinal recesses. For the formation of a stiffening structure in accordance with the invention the steps cited above are now repeated, until a multiplicity of U-shaped draped semi-finished fiber products are arranged adjacent to one another on the tool mold. The semi-finished fiber products are then aligned with one another, with two web halves in each case forming one web of a longitudinal stiffener. For the closure of cavities between joint regions of adjacent semi-finished fiber products these are filled with an appropriate filler material, or with gussets. The structure described above is next compacted, fed into an autoclave process, subjected to a hardening process, and removed from the mold. This embodiment has the particular advantage that with relatively small surface area semi-finished fiber products a stiffening structure of any transverse extent, i.e. width, can be manufactured.

In another embodiment in accordance with the invention a tool mold is provided with longitudinal recesses, and sunken areas extending between the longitudinal recesses. Semi-finished fiber products are then draped on rigid cores to form in each case L-shaped longitudinal stiffener halves. The rigid cores are then arranged in the recesses of the tool mold such that in each case two longitudinal stiffener halves form a T-shaped longitudinal stiffener. Semi-finished fiber products are then positioned in the sunken areas for the formation of mounts. To connect the longitudinal stiffeners with the mounts strap layers are arranged on the feet of the longitudinal stiffeners and the mounts. The structure as described is next compacted, fed into an autoclave process, hardened, and then removed from the mold. This method enables individual positioning of the mounts independently of the longitudinal stiffeners. The contour is specified by the tool mold, i.e. by its recesses and sunken areas; however, the connection of the individual components only takes place after their final and optimal positioning in the tool mold, and thus to one another, by means of the material strips or strap layers.

In a third embodiment in accordance with the invention a tool mold is provided with longitudinal recesses and sunken areas extending between the longitudinal recesses. A flat semi-finished fiber product is then laid down on the tool. To improve the alignment of the semi-finished fiber product on the tool mold it is particularly advantageous if this is embodied as a dry, or nearly dry, surface structure, and thus does not adhere to the tool mold during alignment. Next the longitudinal stiffeners are formed in sequence, the semi-finished fiber product being shaped in each case in the region of the longitudinal recesses by means of a sequence of dies, which for purposes of avoiding any displacements of the semi-finished fiber product on the tool mold remain in their extended positions, i.e. immersed in the longitudinal recesses. After the formation of the longitudinal recesses the mounts are formed by making incisions in the fiber-reinforced semi-finished products between two dies and by introducing the incised semi-finished product sections into the sunken areas. Finally the structure described above is compacted, an infusion of resin is executed, the structure is hardened, and removed from the mold. In this solution it is particularly advantageous that a stiffening structure can be produced from just one semi-finished fiber product and thus the stiffening structure can be embodied without seams or connection points. By this means the stiffening structure can be produced rapidly and with a high level of quality and very tight tolerance limits. In addition to the use of semi-finished fiber products such as bonded NCF materials all materials that can be deformed by means of the application of pressure, such as metals, or sheets of organic materials, can in principle be processed in this embodiment to form a stiffening structure; however, depending upon the choice of material, the infusion of resin may in particular be relinquished.

The formation of the individual longitudinal stiffeners can take place in that an outer, or edgewise, longitudinal stiffener is first formed, and then an adjacent longitudinal stiffener. Likewise an inner, or central, longitudinal stiffener can first be formed, and the other longitudinal stiffeners can then be formed from the interior outwards. In both methods defects of the semi-finished fiber product such as buckling, folding, or bending are reliably eliminated, that is to say, their generation is prevented.

The mounts can in each case just consist of the incised semi-finished product section, or can be reinforced by means of an additional semi-finished product section, which is positioned by means of an appropriate core insert in the respective sunken area of the tool mold.

Since the stiffening structure in accordance with the invention has a certain flexibility in the circumferential or transverse direction, it is advantageous if the lattice structure is stabilised by means of an ancillary frame during removal from the mold. The ancillary frame can at the same time serve as a storage and transport frame, so that load peaks in the stiffening structure are prevented, during handling, for example, in particular as a result of bending in the transverse direction.

A device in accordance with an embodiment of the invention for the manufacture of a lattice-type stiffening structure from at least one semi-finished fiber product for purposes of stiffening a skin field with a tool mold, which has a multiplicity of longitudinal recesses for purposes of forming longitudinal stiffeners, has a multiplicity of sunken areas arranged between the longitudinal recesses for purposes of forming mounts for the connection of circumferential stiffeners. A device of this type serves as a reference structure with very tight tolerances to the longitudinal stiffeners and also to the mounts, such that the longitudinal stiffeners and the track for the circumferential stiffeners can be produced in a defined position with a high level of precision. Moreover, the number of forming elements such as pressure pieces is significantly reduced compared with integral forms of construction of known art.

In one embodiment rigid cores are provided for the formation of the longitudinal stiffeners. These can be components of a multi-part production aid, on which the semi-finished fiber product can be draped before transfer to the tool mold. In one embodiment the multi-part production aid has a multiplicity of sunken areas for purposes of forming the mounts, so that these can already be pre-produced on the multi-part production aid, and labour-intensive positioning or draping tasks on the tool mold can be eliminated.

In one embodiment the device has heatable dies for the formation of the longitudinal stiffeners on the tool mold. With the introduction of heat in the region of the dies the semi-finished fiber product is locally heated in the shaping region, as a result of which the deformability of the semi-finished fiber product in the shaping region can be increased and thus loads during the shaping process can be reduced.

In one embodiment core inserts are provided for the formation of the mounts, on which semi-finished fiber products can be appropriately draped, and by means of which these can then be arranged in the sunken areas.

One stiffening structure in accordance with an embodiment of the invention for purposes of stiffening a skin field of an aircraft fuselage has a multiplicity of longitudinal stiffeners, which are connected by means of mounts extending in the transverse, i.e. circumferential, direction for the connection of transverse, i.e. circumferential, stiffeners to form an integral lattice structure. A stiffening structure of this type can be manufactured with a low level of production resource in a highly precise manner, and can also be conveniently attached to a skin field. Moreover, the connection of circumferential stiffeners is made easier, since the mounts already provide the tracks for the circumferential stiffeners. The stiffening structure can in principle be manufactured from metallic materials, from fiber-reinforced composite materials, or from a combination of both materials, wherein in particular if fiber-reinforced composite materials are used the stiffening structure can be embodied in a manner optimised for weight and loading.

FIG. 1 shows a first integral lattice-type stiffness structure 1 in accordance with an embodiment of the invention made from a semi-finished fiber product 2, for example, a pre-impregnated CFRP non-crimp fabric (NCF), for purposes of connection to a skin field 4 with window cut-outs 6 for the formation of an aircraft fuselage. The stiffening structure 1 has a multiplicity of longitudinal stiffeners, i.e. stringers, 8a, 8b, extending in the longitudinal direction, which by means of mounts 10a, 10b extending in the circumferential direction are connected with one another to form a lattice structure.

The longitudinal stiffeners 8a, 8b are designed integrally with the mounts 10a, 10b, and have in each case in accordance with their T-shaped geometry a foot 12, for purposes of connecting to the skin field 4, and a web 14 extending orthogonally from the foot 12.

The mounts 10a, 10b define in each case a track for purposes of aligning and connecting circumferential stiffeners, i.e. frames, which are not shown. They have in each case a T-shaped profile with a foot 16 for purposes of connection to the skin field 4, and a flange 18 extending orthogonally from the foot 16 for purposes of attaching the circumferential stiffeners.

Figure 2:
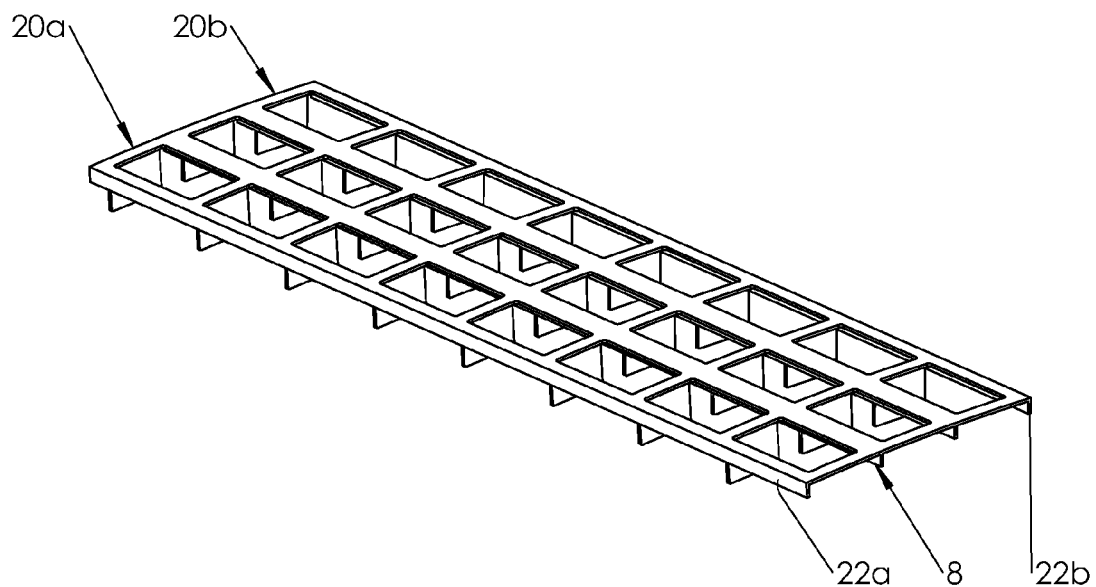
FIGS. 2 to 7 show steps in the method for the manufacture of the first stiffening structure.

In accordance with FIG. 2 the stiffening structure 1 consists of a multiplicity of U-shaped profiles 20a, 20b, which are joined with one another in the region of their side arms 22a, 22b, and thereby form in each case a longitudinal stiffener 8. The manufacture of the U-profiles 20a, 20b, and also their connection for purposes of manufacturing the stiffening structure 1 in accordance with the invention, is shown in FIGS. 3 to 7.

Figure 3:
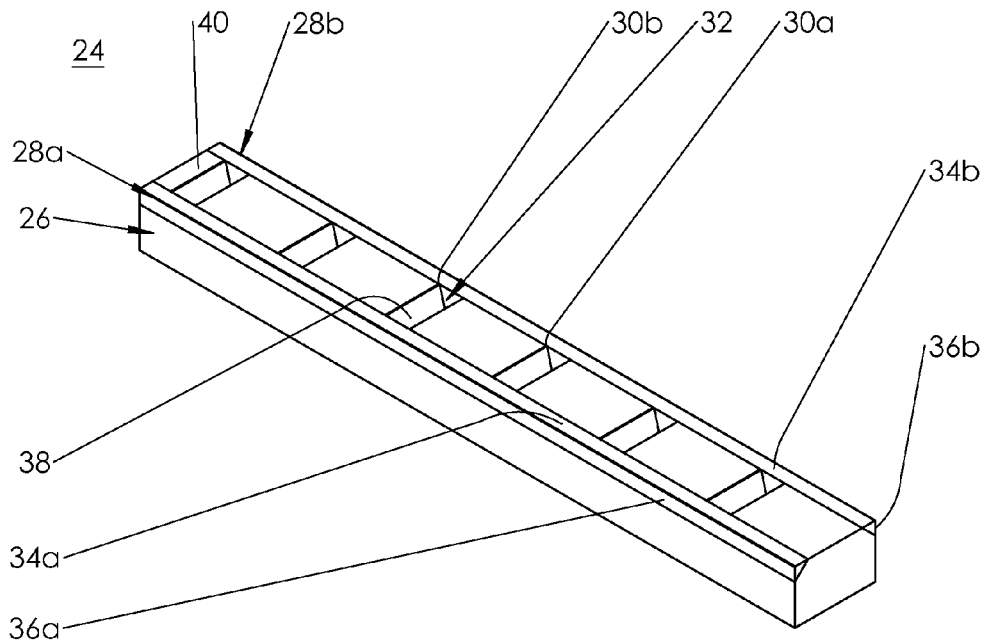

In accordance with FIG. 3, a three-part production aid 24 is provided for the manufacture of the U-profiles 20. This has a supporting core 26, and two rigid cores 28a, 28b, which are positioned in chamfered corner regions of the supporting core 26 that are located at a distance from one another.

The supporting core 26 has a multiplicity of sunken areas 30a, 30b, which in each case are spaced apart from one another by a separating wall 32.

The rigid cores 28a, 28b have a triangular configuration with a first side face 34 and a second side face 36 in each case. The side faces 34a, 34b together with a surface 38 of the separating walls 32 facing towards the observer form a plane ancillary surface 40 for purposes of laying down the semi-finished fiber product 2.

The side faces 36a, 36b in each case define the side arms 22a, 22b, shown in FIG. 2 inter alia, for purposes of forming a half web of the longitudinal stiffeners 8.

Figure 4:
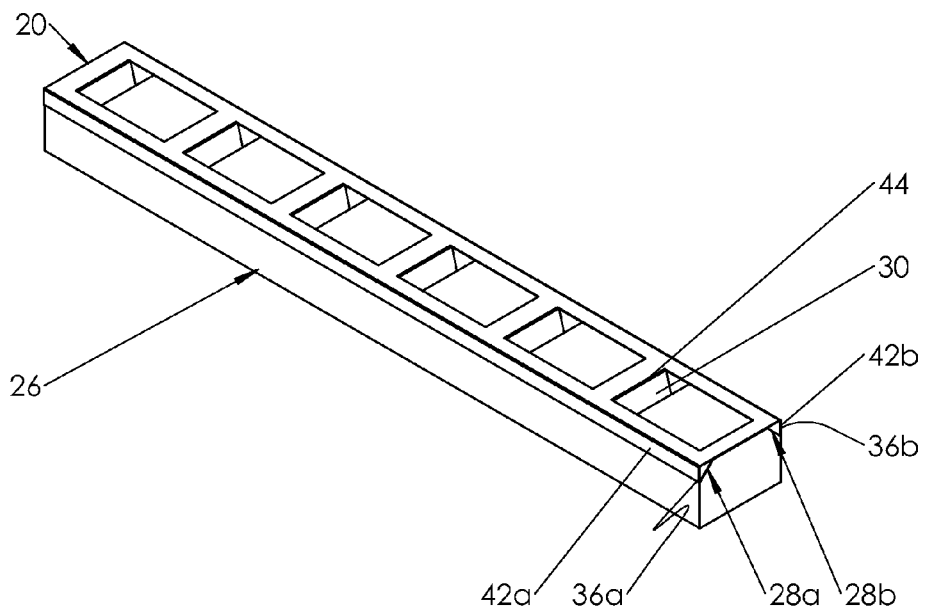

In accordance with FIG. 4 the semi-finished fiber product 2 is laid down flat on the production aid 24, i.e. the supporting core 26, its edge sections 42a, 42b extending in the longitudinal direction being guided around the rigid cores 28a, 28b, and laid down on the side faces 36a, 36b. Incisions are then made in the semi-finished fiber product 2 in the region of the sunken areas 30, such that a multiplicity of incised semi-finished product sections 44 are created. The semi-finished product sections 44 form in each case an L-shaped section of the mounts 10 and are guided along the separating walls 32 into the sunken areas 30, wherein they are supported on the surface 30 and are transformed into their L-shaped configuration.

Figure 5:
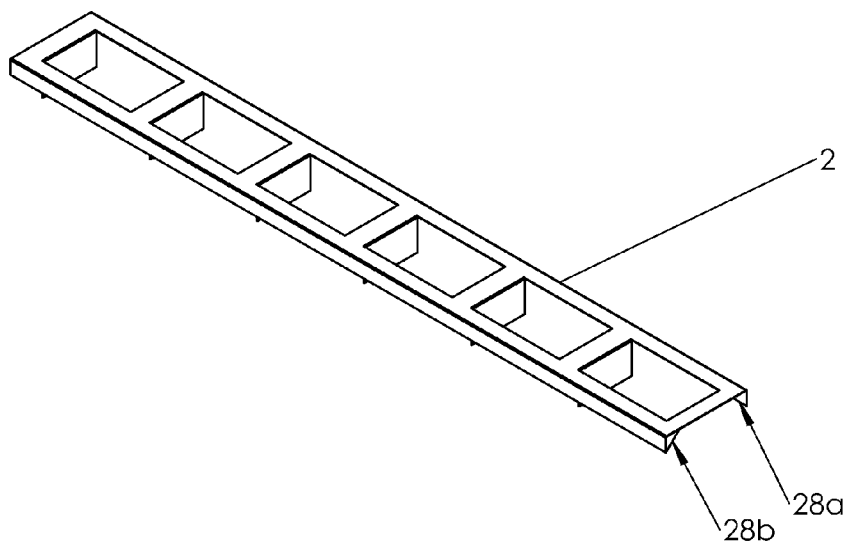
Figure 6:
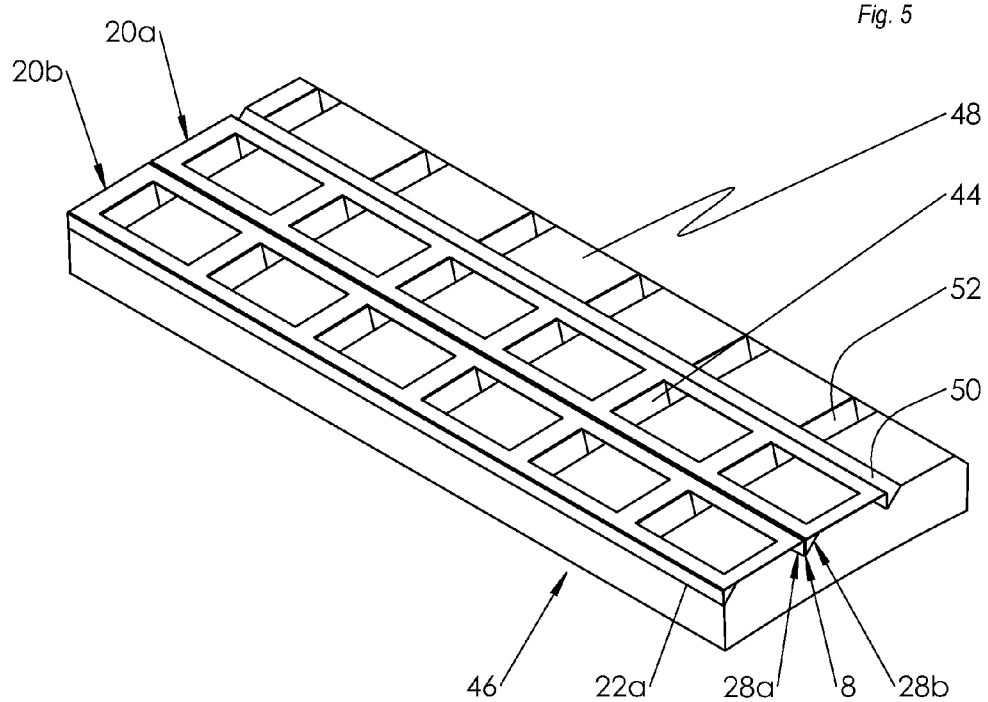

As shown in FIG. 5 the semi-finished fiber product 2 draped to form a U-profile 20 is then extracted by means of the rigid cores 28a, 28b from the supporting core 26, and arranged on a tool mold 46 shown in FIG. 6.

The tool mold 46 has a concave curved surface 48 corresponding to an inner surface of the skin field 4 accommodating the stiffness structure 1, in which a multiplicity of longitudinal stiffeners 50 are formed, between which a multiplicity of sunken areas 52 are arranged. The longitudinal recesses 50 have a triangular cross-section and serve to accommodate in each case two rigid cores 28a, 28b with the draped side arms 22a, 22b for purposes of forming the longitudinal stiffeners 8. The sunken areas 52 serve to accommodate the semi-finished product sections 44 for purposes of forming the mounts 10.

The U-profiles 20a, 20b are laid down in sequence on the tool mold 46, wherein by virtue of their adhesiveness, i.e. their bonding agents, care is to be taken that they first make contact with their side arms 22a, 22b, when they are located in their final position, since no sliding of one surface over another is possible.

Figure 7:
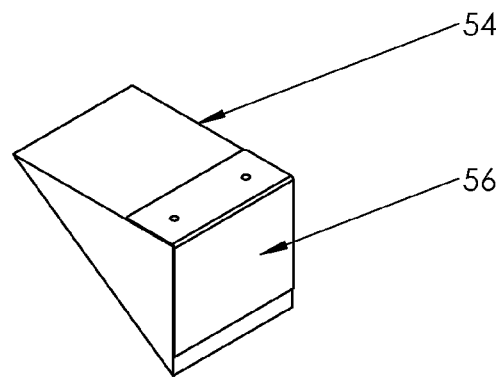

Then by means of a wedge-type core insert 54 shown in FIG. 7 an L-shaped draped pre-impregnated semi-finished fiber product 56 is positioned in each case in the sunken areas 52 such that together with the incised semi-finished product section 44 it forms in each case one of the T-shaped mounts 10. Since an undercut is formed in each case in the region of the mount feet 16 the core inserts 54 are embodied such that they can be dismantled, i.e. they are provided with a flexible casing.

After the positioning of the U-profiles 20a, 20b and the core inserts 54 in the sunken areas 52, filler materials, so-called gussets, are inserted for purposes of forming the mounts 10 so as to form a continuous foot 12, 16 in the joint region of adjacent U-profiles 20a, 20b and in the joint region of the semi-finished fiber products 44, 56.

The structure thus formed is then compacted and at the same time compressed in a vacuum under the action of temperature. Subsequently it is fed into an autoclave process, where inter alia as a result of the thermal expansion of the cores 28, 54, a compaction of the longitudinal stiffeners 8 and the mounts 10 takes place. During the autoclave process inter alia an appropriately shaped pressure plate is laid down on the tool mold and thus on the feet 12, 16 of the U-profiles 20. This can take the form of a continuous surface, or can have cut-outs corresponding to the lattice-type stiffening structure 1 that is being manufactured.

As soon as the stiffening structure 1 has hardened, it is removed from the mold. In this process the pressure plate and the vacuum plant are firstly removed. Then the core inserts 54 are dismantled and removed. Undercuts that form, for example, on the front faces of the mounts 10, are eliminated by the use of moveable core elements, i.e. flexible core elements made, for example, of silicon. Small undercuts can be dealt with by opening out the component radius and/or the elasticity of the stiffening structure 1 in the transversal direction. In addition, the tool mold 46 can be embodied such that it can pivot about its horizontal axis, so that the cores 24, 54 do not have to be fixed during the removal from the mold. To avoid load peaks as a result of severe bends, in particular in the transverse, i.e. circumferential, direction, the stiffening structure 1 is then stiffened with an ancillary frame, extracted from the tool mold 46 and passed forward, for example, to a quality check, or to the skin field 4 for purposes of connection.

Figure 8:
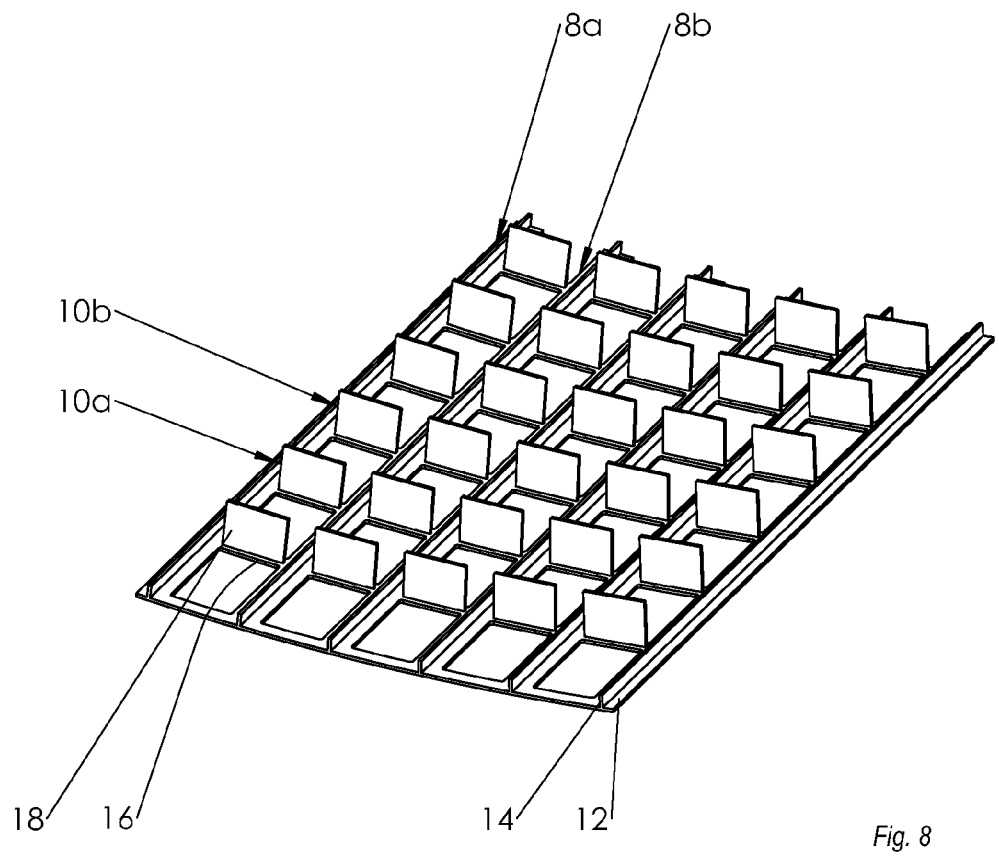
FIG. 8 shows a perspective representation of a second stiffening structure in accordance with another embodiment of the invention.

FIG. 8 shows a second integral lattice-type stiffness structure 60 in accordance with the invention, which is composed of a multiplicity of individual elements such as longitudinal stiffeners 8a, 8b and mounts 10a, 10b. The individual elements 8, 10 consist in each case of pre-impregnated semi-finished fiber products and are connected with one another by means of strap layers in the foot region.

The longitudinal stiffeners 8a, 8b have in each case a T-shaped profile with a foot 12, for purposes of connection to a skin field, and a web 14 extending from the foot 12. The mounts 10a, 10b similarly have in each case a T-shaped profile with a foot 16 and a flange 18 extending from the foot 16 for the connection of circumferential stiffeners.

The longitudinal stiffeners 8 are in each case manufactured by means of two rigid forming cores, which in the interests of improved handling have a certain inherent stiffness. The longitudinal stiffeners 8 are laid down in L-shaped layers on the cores and compacted. In each case two cores prepared in this manner are inserted opposite one another into a longitudinal recess of a tool mold and form in each case a longitudinal stiffener 8.

In an analogous manner to the longitudinal stiffeners 8 the mounts 10 are formed from two L-shaped semi-finished fiber products, and by means of core inserts are laminated into corresponding sunken areas of the tool mold. For the connection of the longitudinal stiffeners 8a, 8b with the mounts 10a, 10b and thus for the formation of the lattice structure, material layers, i.e. strap layers are then laid down on the feet 12, 16 of the longitudinal stiffeners 8 and the mounts 10. The structure thus created is appropriately compacted and subjected to an autoclave process.

The removal of the stiffening structure 60 from the mold takes place essentially in accordance with the above description for FIGS. 1 to 7, such that any repetitive description is unnecessary.

Figure 9:
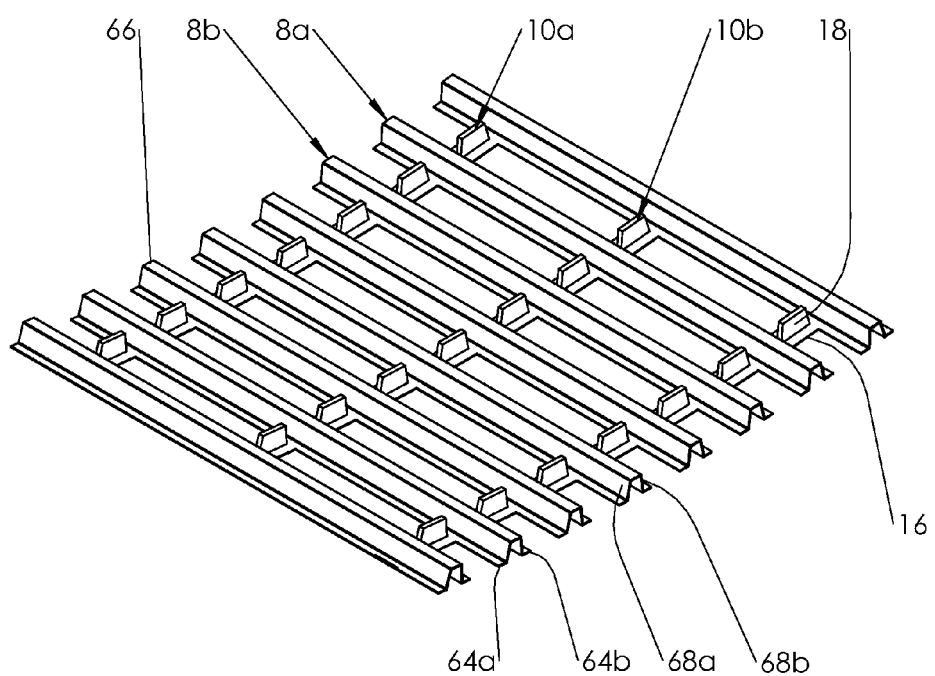
FIG. 9 shows a perspective view of a third stiffening structure in accordance with another embodiment of the invention.

FIG. 9 shows a third integral lattice-type stiffness structure 62 in accordance with the invention, made from a dry semi-finished fiber product 2, for example, a bonded NCF material, that is shaped into a multiplicity of longitudinal stiffeners 8a, 8b and mounts 10a, 10b extending between the longitudinal stiffeners.

Figure 10:
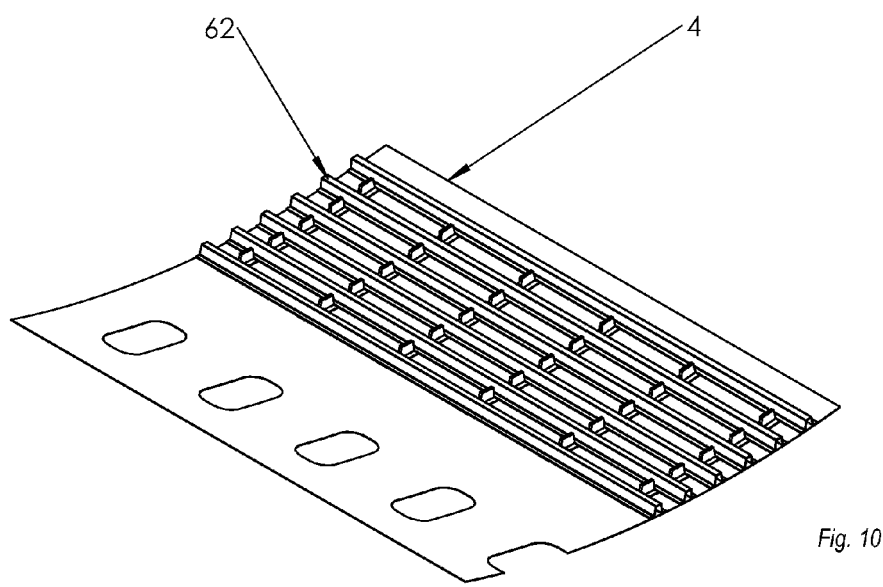
FIG. 10 shows the third stiffening structure in accordance with the invention connected to a skin field.

The longitudinal stiffeners 8a, 8b have an Omega-profile with two outer foot straps 64a, 64b for purposes of connection to a skin field 4 (see FIG. 10), an inner strap 66, and two web sections 68a, 68b for purposes of connecting the outer foot straps 64a, 64b to the inner strap 66.

The mounts 10a, 10b have in each case a T-shaped configuration with a foot 16 for purposes of connection to the skin field 4, and a flange 18 extending orthogonally away from the foot 16 for purposes of attaching a circumferential stiffener in each case.

Figure 11:
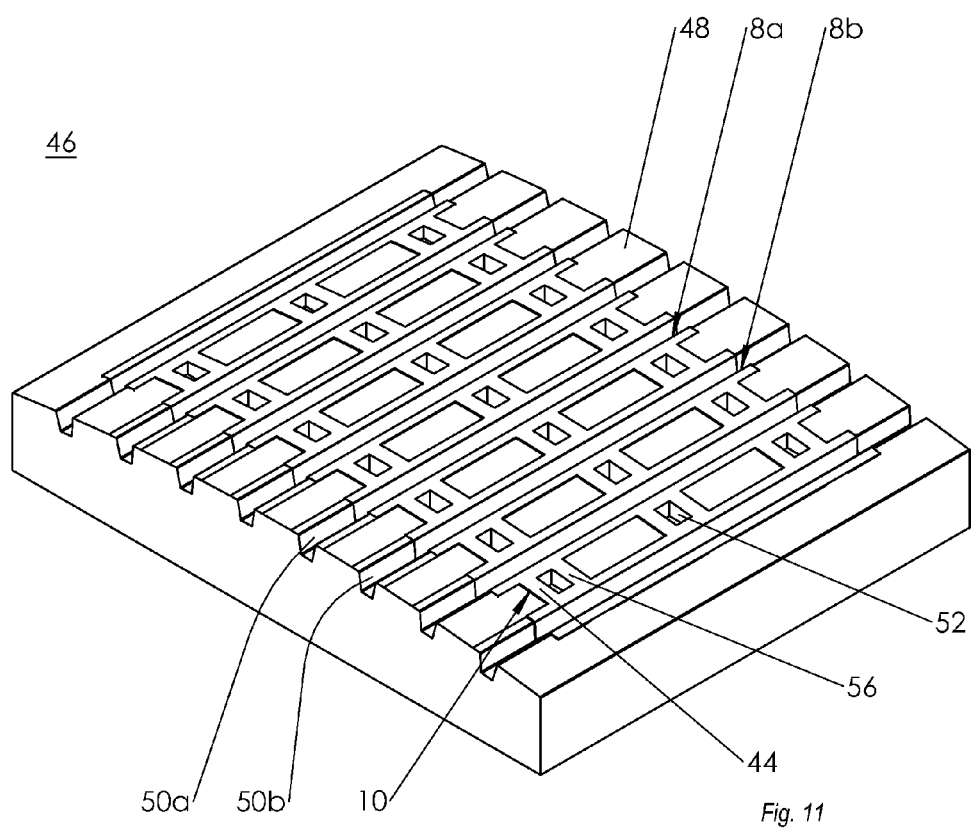
FIG. 11 shows a step in the method for the manufacture of the third stiffening structure.

The manufacture of a stiffening structure 62 of this type takes place in accordance with FIG. 11 on a tool mold 46. The tool mold 46 has a concave curved surface 48 corresponding to an inner surface of the skin field 4 accommodating the stiffness structure 62, in which a multiplicity of longitudinal recesses 50 are introduced for purposes of forming the longitudinal stiffeners 50, and a multiplicity of sunken areas 52 arranged between the longitudinal recesses 50 for purposes of forming the mounts 10.

The semi-finished fiber product 2 is firstly laid down by means of a stentering frame flat on the surface 48 of the tool mold. Then a central longitudinal stiffener 8a is formed in the central longitudinal recess 50a by a section-by-section introduction of the semi-finished fiber product 2 by means of a heatable die and appropriate shaping. The die remains in the longitudinal recess 50a and thus fixes the semi-finished fiber product 2 for the shaping of the further longitudinal stiffeners 8b. These are now shaped from the center outwards by means of a heatable die in each case. In this manner the semi-finished fiber product 2 can in each case be adjusted and any defects in the semi-finished fiber product 2, such as bulges, kinks and stresses, i.e. any damage to the semi-finished fiber product 2, can be avoided.

The formation of the mounts 10 takes place by means of the incisions made in the semi-finished fiber product 2 in the region of the sunken areas 52 and the subsequent lamination of the incised semi-finished product sections 44 into the sunken areas 52. An L-shaped semi-finished fiber product 56, by means of a multi-part core insert in each case is then appropriately positioned for purposes of forming the T-shaped profiles of the mounts 10 in the sunken areas 52 (cf. description accompanying FIGS. 1 to 7).

The structure thus formed is then compacted and evacuated, infiltrated with a resin, and subjected to a hardening process. Here one embodiment provides for the integration of the means for the introduction of casting material and/or extraction of material in the tool mold 46, and for the combination of these with an integrated flow promoter.

The removal of the stiffening structure 62 from the mold takes place essentially in accordance with the above description for FIGS. 1 to 7, such that any repetitive description is unnecessary.

Figure 12:
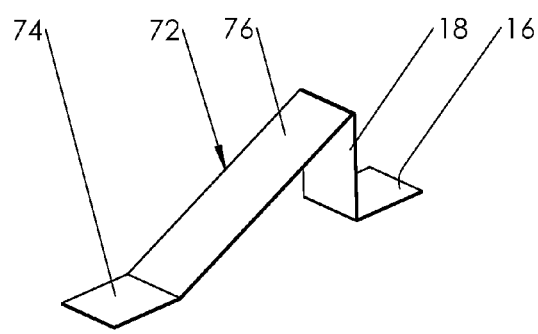
FIG. 12 shows a mount with an integral supporting element.

FIG. 12 shows a mount 70 with a foot 16 for purposes of connection to a skin field, and a flange 18 extending at right angles from the foot for purposes of connection of a circumferential stiffener, which is stabilised by means of a support 72. The support similarly has a foot 74 for purposes of connection to the skin field, which is connected to the header region of the flange 18 by means of an inclined body section 76. Thus the mount 70 has in principle a triangular shape with two feet 16, 74 facing away from one another. The support 72 undertakes the function of the so-called cleats and allows a direct support of the circumferential stiffeners on the skin field 4 in the region of the mounts 70. The introduction of force by means of this clip-cleat combination can be sufficient, at least in less severely loaded regions of the fuselage.

Disclosed is a method, in particular for purposes of stiffening a skin field of an aircraft fuselage, in which an integral lattice-type stiffening structure is subsequently joined to a skin field, a device for the manufacture of a stiffening structure of this type, and a stiffening structure with integrally designed mounts for the connection of circumferential stiffeners.

While the invention has been particularly shown and described with reference to preferred embodiments thereof, it will be understood by those skilled in the art that various changes in form and details may be made therein without departing from the spirit and scope of the invention.

REFERENCE SYMBOL LIST

1 Stiffening structure
2 Semi-finished fiber product
4 Skin field
6 Window cut-out
8 Longitudinal stiffener
10 Mount
12 Foot
14 Web
16 Foot
18 Flange
20 U-profile
22 Side arm
24 Production aid
26 Supporting core
28 Rigid core
30 Sunken area
32 Separating wall
34 Side face
36 Side face
38 Surface
40 Core surface
42 Edge section
44 Semi-finished product section
46 Tool mold
48 Surface
50 Longitudinal recess
52 Sunken area
54 Core insert
56 Semi-finished fiber product
60 Stiffening structure
62 Stiffening structure
64 Foot strap
66 Inner strap
68 Web section
70 Mount
72 Support
74 Foot
76 Body section

What is claimed is:

1. A method for stiffening a skin field of an aircraft fuselage, the method comprising:
providing a skin field for an aircraft fuselage;
manufacturing an integral lattice-shaped stiffening structure including a plurality of longitudinal stiffeners, wherein the integral lattice-shaped stiffening structure includes mounts extending in a transverse direction and connecting the longitudinal stiffeners with each other, the mounts having a profile including a foot configured to be attached to the skin field and a flange extending orthogonally from the foot and outwardly from the stiffening structure such that the mounts are configured to align and connect, by the flanges, circumferential stiffeners to the stiffening structure, the manufacturing including providing a tool having longitudinal elements and sunken areas adapted to form the mounts, the sunken areas extending between the longitudinal elements; and
connecting the stiffening structure to the skin field.

2. The method recited in claim 1, wherein the tool is a production aid and the longitudinal elements include two rigid cores extending in a longitudinal direction of the supporting core, and wherein manufacturing the integral lattice-shaped stiffening structure comprises:
a) laying a flat semi-finished fiber product on the production aid;
b) guiding edge sections of the semi-finished product around the rigid cores so as to form a draped semi-finished fiber product having a U-shaped profile including two web halves;
c) making incisions in the semi-finished fiber product in the vicinity of each sunken area so as to form incised semi-finished product sections, and introducing each incised semi-finished product section into a respective sunken areas so as to form mounts;
d) removing the draped semi-finished fiber product from the supporting core, and positioning the two rigid cores and the draped semi-finished fiber product in longitudinal recesses of a tool mold;
e) introducing the incised semi-finished product sections into sunken areas of the tool mold that extend between the longitudinal recesses;
f) repeating steps a) through e) so as to form a lattice structure of a plurality of draped semi-finished products;

g) aligning the draped semi-finished fiber products in the tool mold such that the edge sections of adjacent draped semi-finished fiber products form a respective web of a longitudinal stiffener;

h) inserting a filler material into joint regions of adjacent semi-finished fiber products; and i) performing compaction of the stiffening structure, executing an autoclave process, hardening the stiffening structure, and removing the stiffening structure from the mold.

3. The method recited in claim 1, wherein the manufacturing the integral lattice-shaped stiffening structure comprises:

a) providing the tool for use as a tool mold, wherein the longitudinal elements are longitudinal recesses of the tool mold;

b) positioning a plurality of semi-finished fiber products on respective rigid cores so as to form a plurality of respective L-shaped longitudinal stiffener halves;

c) positioning the longitudinal stiffener halves in respective ones of the longitudinal recesses of the tool mold so as to form the longitudinal stiffeners, each longitudinal stiffener including a respective foot;

d) laying semi-finished fiber products into the sunken areas so as to form the mounts, each mount having a respective foot;

e) laying strap layers on the feet of the longitudinal stiffeners and mounts; and f) performing compaction of the stiffening structure, executing an autoclave process, hardening the stiffening structure, and removing the stiffening structure from the mold.

4. The method recited in claim 1, wherein the manufacturing the integral lattice-shaped stiffening structure comprises:

a) providing the tool for use as a tool mold, wherein the longitudinal elements are longitudinal recesses of the tool mold;

b) laying a flat semi-finished fiber product onto the tool mold;

c) using a respective die to shape the flat semi-finished fiber product into a respective longitudinal recess of the tool mold;

d) fixing the semi-finished fiber product on the tool mold using the respective die;

e) repeating steps c) and d) so as to form the plurality of longitudinal stiffeners;

f) making incisions in the semi-finished fiber product between respective dies so as to form incised semi-finished fiber product sections, and introducing the incised semi-finished fiber product sections into respective sunken areas so as to form the mounts; and g) performing compaction of the stiffening structure, executing an autoclave process, hardening the stiffening structure, and removing the stiffening structure from the mold.

5. The method recited in claim 4, wherein step c) is performed first in a location corresponding to an interior longitudinal stiffener and subsequent repetitions of step c) are performed from an interior toward an exterior.

6. The method recited in claim 2, further comprising positioning an L-shaped semi-finished fiber product, using a core insert, into each sunken area of the tool mold accommodating an incised semi-finished product section.

7. The method recited in claim 4, further comprising positioning an L-shaped semi-finished fiber product, using a core insert, into each sunken area of the tool mold accommodating an incised semi-finished product section.

8. The method recited in claim 1, wherein the manufacturing includes removing the stiffening structure from a tool mold, wherein the stiffening structure is stabilized using an ancillary frame during the removing of the stiffening structure.

* * * * *